E. Stebbins,
Globe Valve,
No. 868, Reissued Dec. 20, 1859.
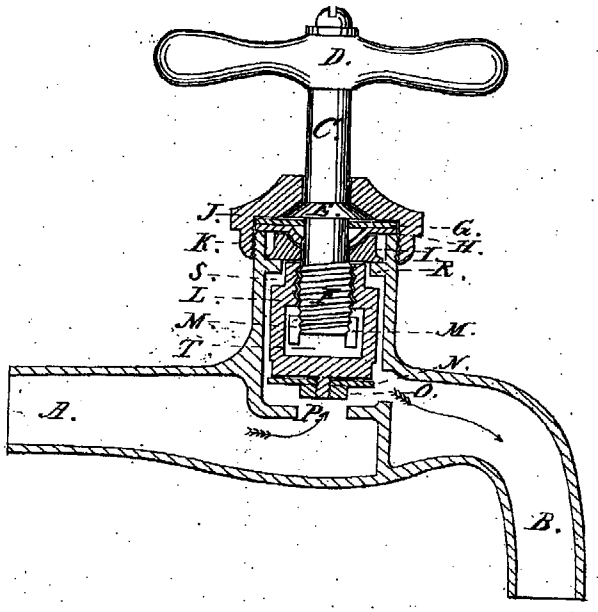
Witnesses:
Edward W. Bliss
Jeremy H. Bliss.
Inventor:
Erastus Stebbins
H. PETERS, PHOTO-LITHOGRAPHER, WASHINGTON, D. C.

UNITED STATES PATENT OFFICE.

ERASTUS STEBBINS, OF CHICOPEE, MASSACHUSETTS.

IMPROVEMENT IN STOP COCKS.

Specification forming part of Letters Patent No. 23,721, dated April 19, 1859; Reissue No. 868, dated December 20, 1859.

*To all whom it may concern:*

Be it known that I, ERASTUS STEBBINS, of Chicopee, county of Hampden, and State of Massachusetts, have invented certain new and useful Improvements in Cocks for Fluids; and I do hereby declare that the same is described and represented in the following specification and drawing; and to enable others skilled in the art to make and use the same, I will proceed to describe its construction and operation, referring to the drawing, in which the same letters indicate like parts in each of the figures.

The nature, design, and object of this improvement may be understood from the following:

Figure 1 shows a central sectional view of my improved cock for fluids.

A represents the induction-tube, made tapering so that they may be driven into wood, soldered to tubing, or having a screw cut thereon for the purpose of securing it into wood, &c., wherever it may be desirable to use it.

B is the eduction-tube.

C shows the screw-spindle in full.

D is a thumb-piece secured to the outer end of the spindle C.

J is a cap through which the spindle C passes, which closes the upper orifice, and having a conical or concave-shape recess corresponding to the shape of the collar E, and having a screw by which the cap is secured, and its seat made tight the by flexible washer H, which lies in the joint thereof.

P is the valve seat and opening.

R is a seat or projection for the collar I.

S is the valve chamber.

The metallic washer G, elastic washer H, and metallic conical or concave-shape collar I constitute one of the peculiar features of this improvement.

L is the screw-chambered nut. The manner of its construction, so as to perfect and facilitate in making them, constitute another desirable achievement in their manufacture. I make the body of the nut square, so as to prevent its turning on its seat, or as it is lifted or depressed, and in finishing or sizing I force them through a die, thus bringing them to a uniform size. I also fit them to the body of the cock by forcing a die corresponding in size and shape to the size and shape of the nut (formed by the die aforesaid) through its bearing-surface in the chamber of the cock, thus fitting them to their place in the most rapid and perfect manner, and thereby preventing their turning when lifted or depressed without the use or necessity of a feather or slot, as in the ordinary way.

M are openings through the body of the nut, which serve to secure more sound and perfect castings, and also more perfectly lubricates the screw L, and also in cutting the nut for the screw F (in the chamber-nut L) the chamber T furnishes room for clearing the chips and the free working of the tool, whereby I am enabled to cut them more rapidly and make a saving of stock.

I am aware that the said nuts may be made without the openings M, while the principle and operation remain the same in effect. I do not, therefore, wish to be confined to the use of them exclusively with the said openings M.

In the stem packing is an elastic substance or washer secured to the end of the nut L by a screw or nut, *o*. Now, it will be seen that by the combined use of the washer G and the conical or concave collar I, I am enabled to introduce the flexible washer H, which, by cutting the center hole for the spindle smaller than the spindle itself, and placing it upon the C, between the washer G and collar I, compresses and makes tight the joint and allows the spindle to work freely, and is found thereby effectually to keep the joint tight a greater length of time than those now in use. It is thought it may be desirable sometimes to add a small wash or wind packing to fill the vacant space produced by the concave collar I.

I do not claim a double cap having a square aperture in which a square-neck nut may slide, as shown in the patent of John Lee Chapman, on October 11, 1851; but

What I claim, and desire to secure by Letters Patent, is—

1. The arrangement and combination of the collar I, flexible washer H, metallic washer G, as and for the purpose described.

2. The chambered square nut or valve, when its seat is formed in the body of the cock, in the manner substantially and for the purpose described.

3. The chambered nut or valve L, having apertures M, as and for the purpose described.

Witnesses: ERASTUS STEBBINS.
EDWARD W. BLISS,
JEREMY W. BLISS.